United States Patent

Matzen et al.

[15] 3,668,407

[45] June 6, 1972

[54] OPTICAL SWITCHING FOR KEYBOARD ENCODER

[72] Inventors: Walter T. Matzen; Hilton Wayne Spence, both of Richardson, Tex.

[73] Assignee: Texas Instruments Incorporated, Dallas, Tex.

[22] Filed: May 28, 1970

[21] Appl. No.: 41,406

[52] U.S. Cl. ....................250/229, 250/237

[51] Int. Cl. ....................H01j 1/56

[58] Field of Search ....................250/229, 225, 237, 219 D; 235/61.11 E

[56] References Cited

UNITED STATES PATENTS

| | | | |
|---|---|---|---|
| 3,017,463 | 1/1962 | Dinsmore | 250/229 |
| 3,104,388 | 9/1963 | Balenger | 250/229 |
| 2,807,728 | 9/1957 | Kilburn | 250/237 |
| 3,457,391 | 7/1969 | Yamamoto | 235/61.11 E |
| 3,334,237 | 8/1967 | Dodsworth | 250/237 |
| 2,641,753 | 6/1953 | Oliwa | 250/229 |
| 3,377,485 | 4/1968 | Amada | 250/237 |
| 3,328,589 | 6/1967 | Ferguson | 235/61.11 E |
| 2,408,754 | 10/1946 | Bush | 250/229 |

OTHER PUBLICATIONS

Protecting Digital Transmissions with Optical Matched Filters by Latorre-Elec. Vol. 38, 5/17/65.

*Primary Examiner*—James W. Lawrence
*Assistant Examiner*—D. C. Nelms
*Attorney*—James O. Dixon, Andrew M. Hassell, Harold Levine, Melvin Sharp, John E. Vandigriff, Henry T. Olsen, Michael A. Sileo, Jr.

[57] ABSTRACT

Disclosed is an optically coded encoder especially adapted for use in keyboards for calculators, adding machines and other applications requiring the generation of coded electrical signals in response to the activation of an input key. Encoding is accomplished by the imposition of an optically coded member in substantially columnar light beams thereby modulating the beams and detection of the modulated beams to generate a code which is uniquely representative of the activated input key.

8 Claims, 6 Drawing Figures

INVENTORS
Hilton W. Spence
Walter T. Matzen

BY Michael A. [signature]
ATTORNEY

Jomes B. Hinsa [signature]
WITNESS

OPTICAL SWITCHING FOR KEYBOARD ENCODER

SUMMARY OF THE INVENTION AND BACKGROUND INFORMATION

This invention relates to optical encoders and, more particularly, to optical encoders for use in keyboards for calculators, adding machines, digital computer input devices, and other similar applications.

The rapid development of electronic calculators, adding machines, digital computers and related devices has created a great need for a simple, reliable and low cost keyboard encoder mechanism suitable as an input device in these applications. The requirements of low cost and high reliability have accelerated the search for encoder mechanisms having a minimum of mechanical parts, such as switches. In addition to improving reliability, reducing the number of mechanical parts reduces noise caused by switch contact bounce and other electro-mechanical devices. Prior art electronic encoder systems have been largely successful in solving these problems; however, new problems peculiar to electronic encoder systems have been encountered. For example, some unsatisfactory aspects introduced by prior art electronic encoder systems for keyboards are: (1) low signal levels, (2) use of high impedance sensors resulting in low immunity to external and internal sources or electrical noise, and (3) complex circuitry resulting in high cost.

In addition to the above problems, which are basically electronic in nature, the mechanical and electrical structures of prior art keyboard encoder mechanisms presented major problems when it was desirable to convert from one code to another. This was especially true if the code conversion was to be made after the keyboard was manufactured.

Although all of the above undesirable characteristics are not necessarily present in each type of prior art keyboard encoder mechanism, most prior art mechanisms do incorporate a sufficient number of these undesirable characteristics to encourage skilled artisans to seek improved encoder techniques and systems. It is within this framework that the present invention will be discussed.

One embodiment of the invention provides an optical encoder which is especially useful for use in a keyboard when it is desirable to generate a coded electrical signal wherein the coded signal uniquely identifies each of the input keys. In this embodiment, a plurality of light sources produce a plurality of substantially columnar light beams. Suitable light detectors are positioned with respect to the light sources so that when the path between each light source and its respective detector is unobstructed, respective columnar light beams impinge on the respective light detectors. A series of optically coded members, including input keys and means to couple the input keys to the optically coded members, are then positioned such that, when an input key is actuated, the respective optically coded member is caused to move into the space between the respective light source and light detector. This results in modulation of the light beam thereby generating a coded system which is definitive of the coded member. When the key is inactivated, a return mechanism causes the coded member to be withdrawn from the space between the light source and the light detector. This may provide additional modulation of the light beam, depending, of course, on the coding technique of the optically coded member. As a direct result of the above described embodiment of this invention, highly reliable, low cost optical encoders having great flexibility are provided.

Another embodiment of the invention provides an encoder for use in keyboards, for example, in which a plurality of light sources produce a plurality of substantially columnar light beams which are positioned with respect to a plurality of light detectors such that, when the optical field between the light sources and the light detectors is unobstructed, each of the light beams impinge on one and only one light detector. A series of optically coded members are positioned remote from these light beams and are provided with suitable mounting and actuating means, an input key, for example, such that when each of the actuating means is operated, the optically coded member associated with that actuating means is caused to be positioned within the light beams and thereby modulate them. In this embodiment, modulation is accomplished by a series of two groups of light transmitting regions, with each group being arranged such that the light transmitting regions essentially form two straight lines. Offset from these lines are two additional light transmitting regions which are used for modulating a light beam for generating control signals. The two groups of light transmitting regions form lines which are essentially parallel to each other and to two edges of the optically coded member. The remaining two edges of the optically coded member are essentially perpendicular to the two edges previously discussed thereby making the optically coded member essentially rectangular in shape.

Still another embodiment of the invention provides an optical encoder, including the light sources as previously discussed with respect to the previous two embodiments, in which one edge of the optically coded member is formed by a plurality of substantially straight line segments, thereby effectively dividing the optically coded member into a plurality of substantially rectangular segments. Elongated light transmitting regions are selectively formed within the optically coded member for coding purposes. In addition to providing position coding, which is essentially forming or not forming a light transmitting region within the optically coded member for modulation purposes, this embodiment particularly provides pulse width coding due to the differing lengths of the various elongated regions. In addition to providing control signals in essentially the same manner as the previous embodiments, additional signals may be generated by sensing the irregular edge of the optically coded member, which is formed by a series of substantially straight lines, as the member is being positioned within the optical field.

One object of the invention is to provide a highly reliable, low cost keyboard for use, for example, in calculators, adding machines, digital computers, and similar applications.

Another object of the invention is to provide a keyboard wherein the activation of a key is sensed optically.

Another object of the invention is to provide an optical keyboard wherein the code identifying a particular key can be readily changed after manufacture.

Another object of the invention is to provide an optical keyboard sensing apparatus having high noise immunity.

These and other objects of this invention will be clear to those skilled in the art in view of the attached drawings and the detailed description of the preferred embodiments.

DETAILED DESCRIPTION OF THE INVENTION

A detailed description of preferred embodiments of this invention follows with reference being made to the drawings wherein like parts have been given like reference numbers for clarity and understanding of the elements and the novel, useful and unobvious features of this invention.

Figure 1:
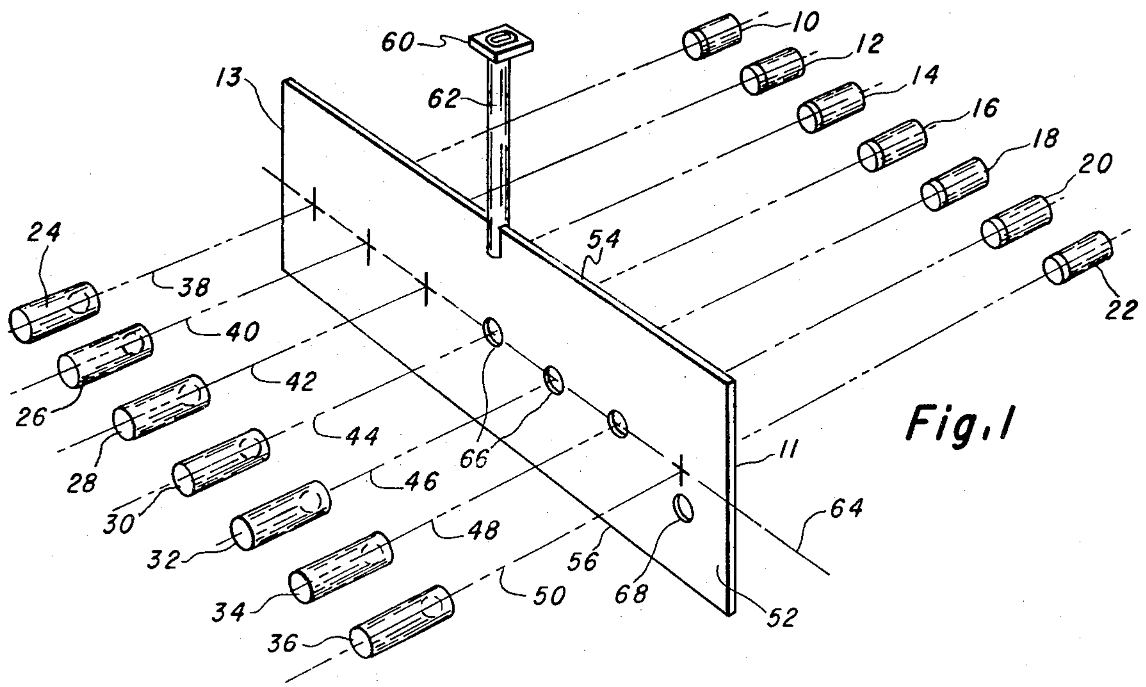
FIG. 1 is an isometric view of an optical/mechanical schematic showing an optically coded member interposed within a columnated light beam and positioned between light sources and light detectors.

Referring to FIG. 1 which shows the preferred embodiment of this invention, the optically coded member 52 is disposed within an optical field generated by light sources 24, 26, 28, 30, 32, 34, and 36 and light detectors 10, 12, 14, 16, 18, 20, and 22. The optically coded member 52 is a thin substantially rectangular piece of opaque material, metal, for example, having a top edge 54 and a bottom edge 56 which are substantially parallel to each other and two side edges 11 and 13 which are also relatively parallel to each other resulting in the optically coded member 52 being substantially rectangular in shape. A series of light transmitting areas 66 are selectively positioned along the center line 64 of the optically coded member 52. Another light transmitting area 68 is offset from the center line 64 toward the bottom edge 56 of the optically coded member 52. Attached to the optically coded member 52 by a shank 62 is an input key 60. The shank 62 and the key 60, in conjunction with a suitable return mechanism (not shown) are used to position the optically coded members 52 within the optical field when the input key 60 is activated. Details of the return mechanism will be discussed later.

When the optical encoder of FIG. 1 is installed in a keyboard, for example, or other similar application, the optically coded member 52 has two positions and travels between these two positions thereby defining a cycle of operation when the input key 60 is actuated. In the first or unactuated position, the optically coded member 52 is disposed above and remote from the optical field generated by the light sources 24–36 thereby permitting the columnated light beams to pass unobstructed from the light sources 24–36 to the light detectors 10–22. When the input key 60 is actuated, the optically coded member 52 moves from its position remote from the columnated light beams to the position shown in FIG. 1 and when the input key 60 is released, the optically coded member 52 returns to its first position such that the light beams 38–50 are again unobstructed. During this transition of the optically coded member 52, the sensors 10–22 will generate outputs as shown in FIG. 5.

Figures 4, 5:
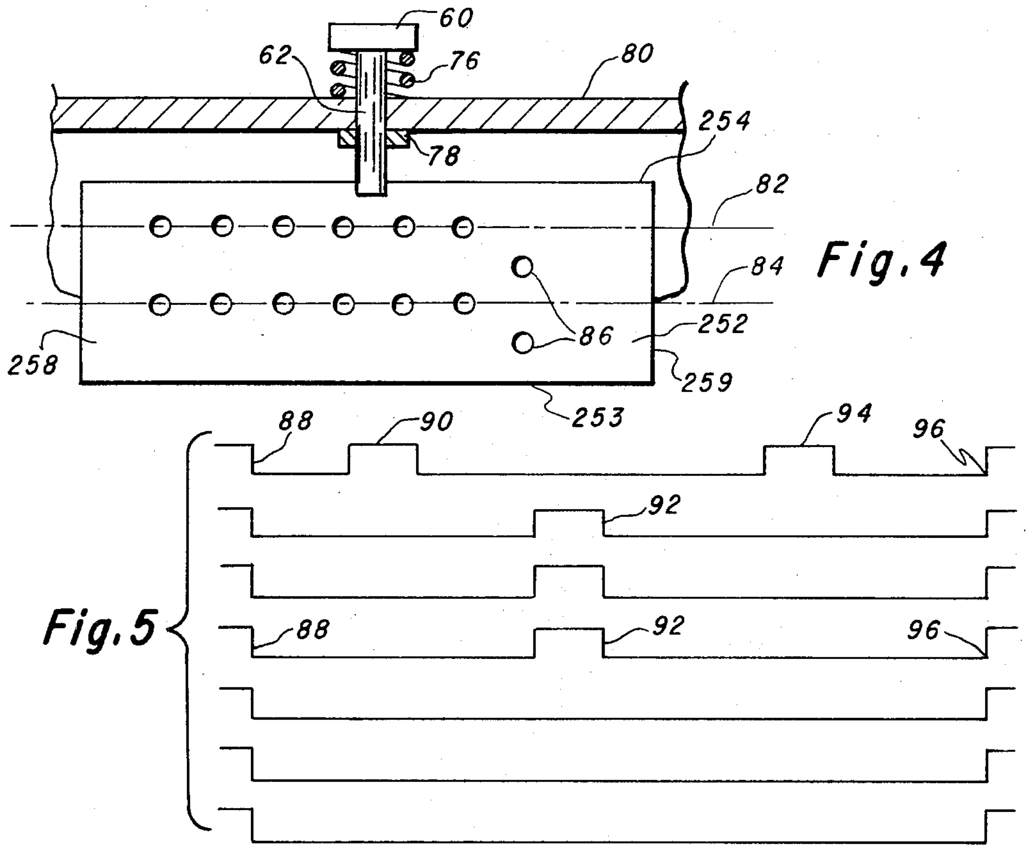
FIG. 4 is an end view of another embodiment of an optically coded member in accordance with this invention with some of the parts shown in cross-section for graphic simplicity.
FIG. 5 shows ideal digital outputs generated by the system of FIG. 1 when the optically coded member completes its modulating cycle.

The first condition of the detector output as shown generally at reference numeral 88 in FIG. 5 results from the interruption of the light beams by the lower edge 56 of the optically coded member 52 as the optically coded member moves into the optical field formed by the light sources and detectors. As the optically coded member 52 is moved into the optical field, the light transmitting region 68 permits light beam 50 to pass through light transmitting region 68 and impinge upon light detector 22. This generates an output from sensor 22 as shown generally at reference numeral 90 in FIG. 5. When the optically coded member 52 is fully positioned within the optical field as shown in FIG. 1, the light transmitting regions 66 selectively positioned along the center line 64 as shown generally at reference numeral 66 permit selected light beams to pass through light transmitting regions 66 and impinge upon their respective light detectors 10–22. As shown in FIG. 1, three light beams 44, 46 and 48 are permitted to pass through their respective light transmitting regions and impinge upon light detectors 16, 18 and 20. The remaining light beams 38, 40, 42 and 50 impinge upon regions of the optically coded member having low light transmitting capability and as a result their respective sensors 10–14 and 22 receive very little light from their respective light sources. When the key 60 is released, the optically coded member 52 is again positioned by a return mechanism so that all of the light beams 38–50 again impinge upon their respective detectors 10–22. Output signals are generated due to the light transmitting region along the center line 64, as shown generally at reference numeral 92 in FIG. 5. Signal 94, as shown in FIG. 5, is generated due to the light transmitting region 68. The light transmitting regions along the center line 64 are selectively formed in each optically coded member 52. Each of these light transmitting regions in conjunction with its respective light source and light detector forms a "code channel," wherein each channel may be coded to have either light transmitting or light blocking characteristics, when the optically coded member 52 is fully positioned within the optical field as shown in FIG. 1. By proper selection of the number of coding channels and selectively positioning these light transmitting regions 66 within each optically coded member 52, each optically coded member 52 can be coded such that the light detectors 10–22 generate an output code thereby identifying the optically coded member which is positioned within the optical field as shown in FIG. 1. Additionally, the light transmitting region 68, which is offset from the center line 64, generates at least one signal preceeding and at least one signal following the signals resulting from the light transmitting regions 66 which are selectively positioned along the center line 64. These signals are respectively illustrated at reference numerals 90 and 94 in FIG. 5. As the edges 56 of the optically coded member 52 move into and out of the optical field generated by the light sources 24–36 and the light detectors 10–22, the outputs of all the light detectors 10–22 change, as respectively illustrated generally at reference numerals 88 and 96 at FIG. 5. The change in the output of all the sensors, illustrated generally at 88 and 96, in conjunction with the signal resulting from light transmitting region 68, is useful in defining a "key operation cycle" and generating control signals which always precede and follow the signals due to light transmitting regions 66. These signals simplify the interface 74 between the encoder and systems to which the encoder is to be connected.

In each application, the number of optically coded members 52, in conjunction with the number of "coding channels" will determine the structure of the coding system to be used. The encoder which is the subject of this invention provides flexibility in choosing a coding system since it is very economical to add additional "coding channels" because adding a channel only requires one additional light source and its associated light detector.

Shown below is a coding system for the number 0–9 and 10 arbitrary functions which may be used with the embodiment shown in FIG. 1. In this coding system, coding channels A–F respectively correspond to the channels generated by light sources 24–36 in conjunction with optically coded member 52 and light detectors 10–22 assuming the output of the sensor to be high when light from its respective source impinges upon it. The specific optically coded member 52 illustrated in FIG. 1 is coded for the number "0."

| Number | Channels | | | | | |
|---|---|---|---|---|---|---|
| | A | B | C | D | E | F |
| 0 | 0 | 0 | 0 | 1 | 1 | 1 |
| 1 | 0 | 0 | 1 | 1 | 0 | 1 |
| 2 | 0 | 1 | 0 | 1 | 0 | 1 |
| 3 | 0 | 1 | 1 | 1 | 0 | 0 |
| 4 | 1 | 0 | 0 | 1 | 0 | 1 |
| 5 | 1 | 0 | 1 | 1 | 0 | 1 |
| 6 | 1 | 1 | 0 | 1 | 0 | 0 |
| 7 | 1 | 0 | 1 | 1 | 1 | 0 |
| 8 | 0 | 1 | 0 | 1 | 1 | 0 |
| 9 | 1 | 0 | 0 | 1 | 1 | 0 |
| $F_1$ | 1 | 1 | 1 | 0 | 0 | 0 |
| $F_2$ | 1 | 1 | 0 | 0 | 1 | 0 |
| $F_3$ | 1 | 0 | 1 | 0 | 1 | 0 |
| $F_4$ | 1 | 0 | 0 | 0 | 1 | 1 |
| $F_5$ | 0 | 1 | 1 | 0 | 1 | 0 |
| $F_6$ | 0 | 1 | 0 | 0 | 1 | 1 |
| $F_7$ | 0 | 0 | 1 | 0 | 1 | 1 |
| $F_8$ | 1 | 1 | 0 | 0 | 0 | 1 |
| $F_9$ | 1 | 0 | 1 | 0 | 0 | 1 |
| $F_{10}$ | 0 | 1 | 1 | 0 | 0 | 1 |

Figures 2, 3:
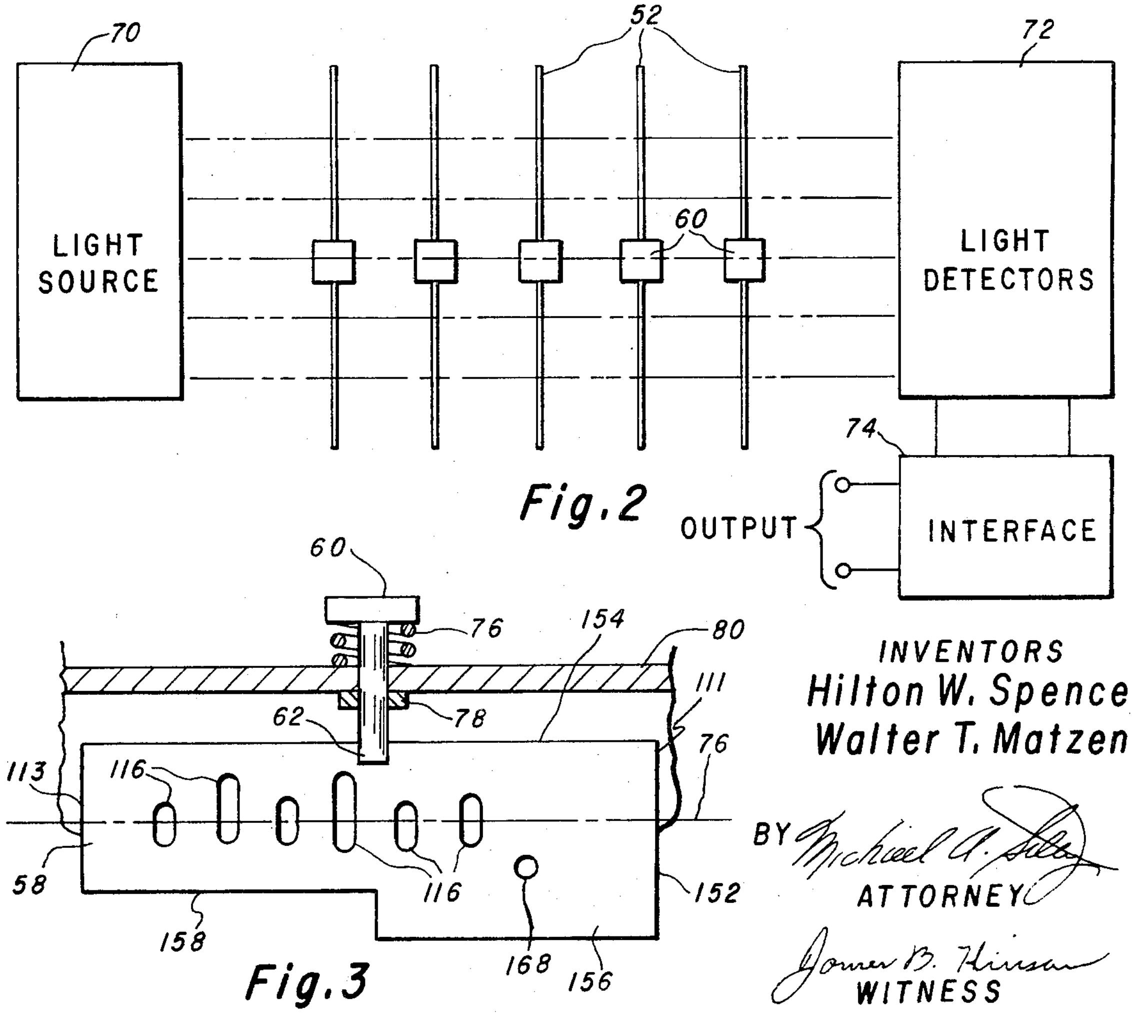
FIG. 2 is a top view of an optical/mechanical schematic showing a series of optically coded members interposed within columnated light beams and positioned between a light source generating such columnated light beams and light sensors for detecting the light beams as modulated by the interposed optically coded members, and an interface for converting the sensor output to a desired form useful in the particular application.
FIG. 3 is an end view of one embodiment of an optically coded member in accordance with this invention with some of the parts shown in cross-section for graphic simplicity.

FIG. 3 illustrates another embodiment of the optical encoder, including a mounting and positioning mechanism. In this embodiment, the optically coded member 152 comprises a relatively thin member having a top side 154, bottom sides 156, 158, and two edges 111 and 113. The bottom edge 156 is divided into two substantially straight segments which, in combination with the top side 154 and the two edges 111 and 113, devide the optically coded member into two substantially rectangular areas. A plurality of elongated light transmitting regions 116 are selectively formed within the optically coded member 152. As previously discussed in connection with FIG. 1, light transmitting region 168 can provide a control signal preceding and following the coded signal due to the light transmitting regions 116. Sequential sensing of the bottom edges 156 and 158 of the optically coded member 152, as it is positioned within the optical field, can provide additional control signals which may be useful as previously discussed in connection with the bottom edge 56 of FIG 1. Additionally, FIG. 3 includes a shank 62 and a key 60 attached to the optically coded member 152. Interposed between the optically coded member 152 and the key 60 and on the shank 62 is a retaining ring 78, a mounting plate 80 and a return spring 76. These are arranged such that the retaining ring 78 is disposed between the upper edge 154 of the optically coded member 152 and the mounting plate 80. The return spring 76 is disposed between the key 60 and the mounting plate 80. The optically coded member may be utilized in combination with the light sources 24–36 and the light detectors 10–22 of FIGS. 1 and 2. When mounted into a keyboard assembly, the optically coded member is held in a position remote from the optical field formed by the light sources 24–36 and the light sensors 10–22. Activation of the input key 60 compresses the return spring 76 and positions the optically coded member 152 within the optical field causing light beam modulation. The light beam modulation is a result of areas having varying light transmitting characteristics being selectively formed within the optically coded member 152, as previously discussed with reference to FIG. 1. This mounting and return mechanism may be used with all illustrated embodiments of this invention.

FIG. 4 illustrates still another embodiment of this invention. This embodiment includes an optically coded member 252 having top and bottom sides, respectively illustrated at reference numerals 254, 253, and two sides illustrated at reference numerals 258, 259. Included is a mounting plate 80, shank 62, return spring 76, and key 60, all substantially similar to those previously discussed in reference to FIG. 3. Light transmitting regions used to code the optically coded member 252 are formed along two substantially straight lines 82,84, which are substantially parallel to each other and the top and bottom edges 254, 253. Two additional light transmitting regions, illustrated generally at 86, are included for the purposes of generating control signals similar to those previously discussed with reference to FIG. 1.

Figure 6:
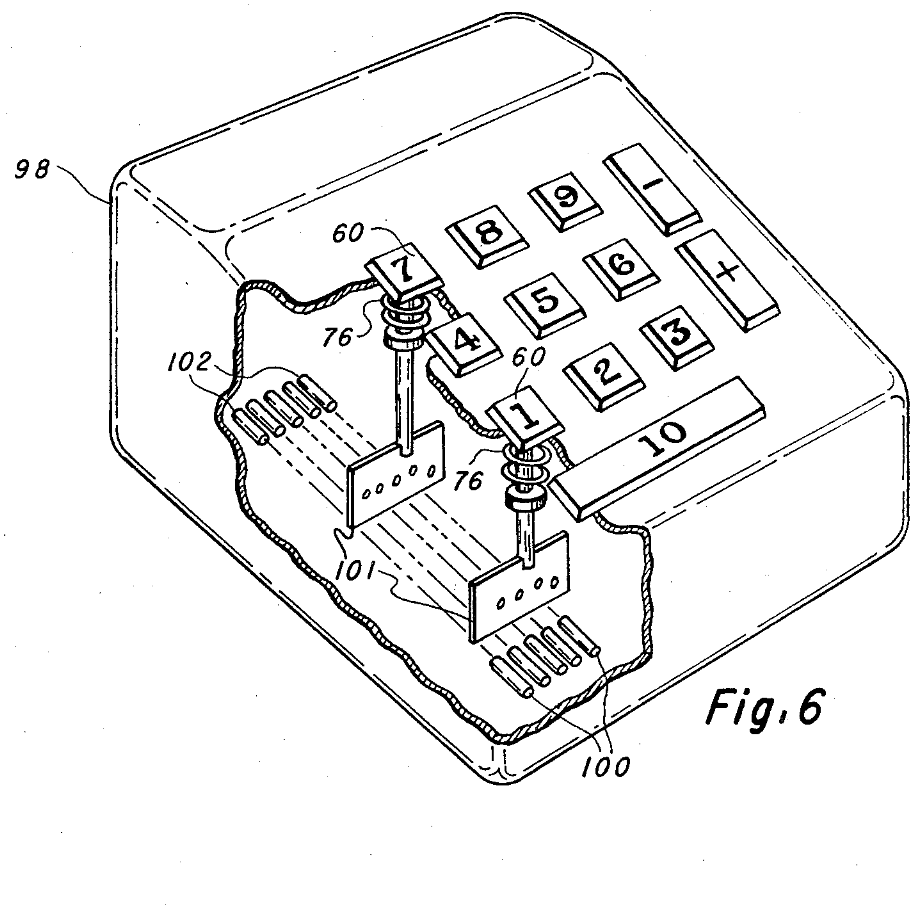
FIG. 6 is an isometric view of a keyboard showing an optically coded member in accordance with this invention with parts thereof cut away for graphic purposes.

FIG. 6 illustrates one application of the optical encoder system which is the subject of this invention. Illustrated is a keyboard mechanism 98 of the type used in calculators or the like. Mounted within the mechanism is a plurality of light sources illustrated generally at reference numeral 102, a plurality of light detectors illustrated generally at reference numeral 100. and a plurality of optically coded members illustrated generally at reference numeral 101.

The keyboard 98 of FIG. 6 includes mounting shanks, retaining rings, return springs, and input keys of the type for example, discussed above. It is contemplated that mounting means may be used to mount the optically coded members remote from the input key and to interconnect them with the input keys. This alternate embodiment of the present invention will necessitate that the optically coded members utilize the same light sources and detectors.

Although the optically coded member has been discussed with reference being made to the preferred embodiments wherein the optical coding was performed by forming within the optical coded member light transmitting regions, it is contemplated that other optical techniques for optical modulation purposes could be used without departing from the spirit and scope of this invention. By way of example, the following alternate structural embodiments for optical modulation and coding are contemplated: (1) systems wherein the basic optical coded member is essentially light transmitting with regions having light blocking characteristics selectively formed therein; (2) systems wherein the light emitters have narrow spectrum emission characteristics and an optically coded member which has selectively formed therein regions having either blocking or transmitting characteristics within the same spectrum; (3) systems wherein polarized light, either emitted by the sensors or formed by some other means, such as a polarizer, is used in conjunction with optically coded members which are coded by selectively forming therein regions having polarized light transmitting or blocking characteristics. It is also contemplated that spectrum emission characteristics and the polarized light transmitting or blocking characteristics may be preselected by applying an electric field of selected magnitude and/or direction across the optically coded member.

The present invention has been described and defined in detail and illustrated in preferred embodiments. It will be apparent, therefore, to one skilled in the art herein encompassed that changes and modifications are possible within the ordinary skill of such artisans without departing from the spirit and contemplated scope of the invention as described, defined and illustrated herein.

What is claimed is:

1. An optical keyboard encoder system comprising in combination:

a. light generating means for generating a preselected optical field;

b. an optically coded member having first and second portions, said first portion comprised of a material with optical blocking characteristics within said preselected optical field and said second portion comprised of said material with optical blocking characteristics and additionally having selectively positioned, optically transmissive areas in conjunction with selective areas of said material with optical blocking characteristics defining a selected code for modulating said optical field in accordance with the selected code;

c. key operative means coupled to said optically coded member for selectively positioning said first portion of said optically coded member within said preselected optical field to completely block said optical field whereby the transmission of a coded signal is indicated and then selectively positioning said second portion of said optically coded member within said preselected optical field in accordance with the code defined by said optically transmissive areas and optical blocking areas as a key is depressed and then again selectively positioning said first portion of said optically coded member within said preselected optical field to again completely block said optical field for a finite period of time whereby the completion of the transmission of a coded signal is indicated as said key is released; and d. detecting means positioned to receive said optical field for generating modulated coded output signals indicative of the selected code defined by the optically transmissive areas and optical blocking areas of the second portion of said optically coded member.

2. The optical encoder system of claim 1 wherein said detecting means is comprised of a plurality of light detectors within the optical range of said optical field positioned in a row.

3. The optical encoder system of claim 2 wherein said optically transmissive areas and optical blocking areas of the second portion of said optically coded member are selectively positioned in a row substantially parallel to the row of detector means with each area having a corresponding detector means whereby said modulated selected code is received by said detecting means.

4. The optical encoder system of claim 1 wherein said optically coded member comprises a thin, substantially rectangular opaque member having small, transparent areas selectively formed in the second portion thereof.

5. The optical encoder system of claim 1 wherein said optically coded member comprises a thin, substantially rectangular opaque member having apertures selectively positioned in the second portion thereof to provide said optically transmissive areas of said optically coded member.

6. An optical keyboard encoder system comprising in combination:

a. light generating means for generating a preselected optical field;

b. an optically coded member having first, second and third portions, said first portion comprised of a material with optical blocking characteristics within said preselected optical field, said second portion comprised of said material with optical blocking characteristics and additionally having a selectively positioned optically transmissive area for modulating said optical field to provide control signals and said third portion comprised of said material with optical blocking characteristics and additionally having selectively positioned optically transmissive areas in conjunction with selective areas of said material with optical blocking characteristics defining a selected code for modulating said optical field in accordance with the selected code;

c. key operative means coupled to said optically coded member for selectively positioning said first portion of said optically coded member within said preselected optical field to completely block said optical field and then selectively positioning said second portion of said optically coded member with said preselected optical field to selectively modulate said optical field to provide a control signal indicative of the transmission of a modulated optical code and then selectively positioning said third portion of said optically coded member within said preselected optical field to selectively modulate said optical field in accordance with the code defined by said optically transmissive areas and optical blocking areas of said third portion as a key is depressed and then again selectively positioning said second portion of said optically coded member within said preselected optical field to selectively modulate said optical field to provide a control signal indicative of the completion of a transmitted code signal and then again selectively positioning said first portion of said optically coded member within said preselected optical field to again completely block said optical field for a finite period of time as said key is released; and d. detecting means positioned to receive said optical field for generating modulated coded output signals indicative of said control signals and of said selected code defined by the optically transmissive areas and optical blocking areas provided by the second and third portions of said optically coded member, respectively.

7. An optical keyboard encoder system comprising in combination:

a. light generating means for generating a preselected optical field;

b. an optically coded member having first, second and third portions, said first portion comprised of a material with optical blocking characteristics within said preselected optical field and additionally having a selectively positioned optically transmissive area for modulating said optical field to provide control signals, said second portion comprised of said material with optical blocking characteristics within said preselected optical field and said third portion comprised of said material with optical blocking characteristics and additionally having selectively positioned optically transmissive areas in conjunction with selective areas of said material with optical blocking characteristics defining a selected code for modulating said optical field in accordance with the selected code;

c. key operative means coupled to said optically coded member for selectively positioning said first portion of said optically coded member within said preselected optical field to selectively modulate said optical field to provide a control signal indicative of the transmission of a modulated optical code and then selectively positioning said second portion of said optically coded member within said preselected optical field to completely block said optical field and then selectively positioning said third portion of said optically coded member within said preselected optical field to selectively modulate said optical field in accordance with the code defined by said optically transmissive areas and optical blocking areas of said third portion as a key is depressed and then again selectively positioning said second portion of said optically coded member within said preselected optical field to again completely block said optical field and then again selectively positioning said first portion of said optically coded member within said preselected optical field to selectively modulate said optical field to provide a control signal indicative of the completion of a transmitted code signal as said key is released; and d. detecting means positioned to receive said optical field for generating modulated coded output signals indicative of sad control signals and of said selected code defined by the optically transmissive areas and optical blocking areas provided by the first and third portions of said optically coded member, respectively.

8. An optical keyboard encoder system comprising in combination:

a. light generating means for generating a preselected optical field;

b. an optically coded member having first, second, third, fourth and fifth portions, said first portion comprised of a material with optical blocking characteristics within said preselected optical field, said second portion comprised of said material with optical blocking characteristics and additionally having a selectively positioned optically transmissive area for modulating said optical field to provide a first control signal, said third portion comprised of said material with optical blocking characteristics and additionally having selectively positioned optically transmissive areas in conjunction with selective areas of said material with optical blocking characteristics defining a first selected code for modulating said optical field in accordance with the first selected code, said fourth portion comprised of said material with optical blocking characteristics and additionally having a selectively positioned optically transmissive area for modulating said optical field to provide a second control signal and said fifth portion comprised of said material with optical blocking characteristics and additionally having selectively positioned optically transmissive areas in conjunction with selective areas of said material with optical blocking characteristics defining a second selected code for modulating said optical field in accordance with the second selected code;

c. key operative means coupled to said optically coded member for selectively positioning said first portion of said optically coded member within said preselected optical field to completely block said optical field and then selectively positioning said second portion of said optically coded member within said preselected optical field to selectively modulate said optical field to provide a control signal indicative of the transmission of a first modulated optical code and then selectively positioning said third portion of said optically coded member within said preselected optical field to selectively modulate said optical field in accordance with the first selected code defined by said optically transmissive areas and optical blocking areas of sad third portion and then selectively positioning said fourth portion of said optically coded member within said preselected optical field to selectively modulate said optical field to provide a second control signal indicative of the transmission of a second modulated optical code and then selectively positioning said fifth portion of said optically coded member within said preselected optical field to selectively modulate said optical field in accordance with the second selected code defined by said optically transmissive areas and optical blocking areas of said fifth portion as a key is depressed and then again selectively positioning said fourth portion of said optically coded member within said preselected optical field to selectively modulate said optical field to provide a control signal indicative of the completion of the transmission of coded signals from said third and fifth portions and then again selectively positioning said first portion of said optically coded member within said preselected optical field to again completely block said optical field for a finite period of time as said key is released; and d. detecting means positioned to receive said optical field for generating modulated coded output signals indicative of said control signals and of said first and second selective codes defined by the optically transmissive areas and optical blocking areas provided by the second and fourth, and the third and fifth portions of said optically coded member, respectively.

* * * * *